(12) United States Patent
Carmon et al.

(10) Patent No.: US 8,649,823 B2
(45) Date of Patent: Feb. 11, 2014

(54) FEMTOCELL BASE STATION FOR CONTROLLING COMMUNICATION ACCORDING TO SPECIFIED CRITERIA

(75) Inventors: Rafael Carmon, Rishon le Zion (IL); Alon Shechter, Herzeliya (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/116,264

(22) Filed: May 26, 2011

(65) Prior Publication Data

US 2011/0294495 A1   Dec. 1, 2011

Related U.S. Application Data

(60) Provisional application No. 61/348,775, filed on May 27, 2010.

(51) Int. Cl.
*H04W 24/00* (2009.01)
*H04W 4/00* (2009.01)

(52) U.S. Cl.
USPC ...................... 455/561; 455/456.4; 455/422.1

(58) Field of Classification Search
USPC ............. 455/411, 412.1, 412.2, 414.1, 404.1, 455/404.2, 405, 422.1, 456.4
See application file for complete search history.

(56) References Cited

U.S. PATENT DOCUMENTS

| | | | | |
|---|---|---|---|---|
| 7,917,159 | B1* | 3/2011 | Westfield | 455/456.4 |
| 2006/0270391 | A1* | 11/2006 | Kim et al. | 455/414.1 |
| 2008/0096518 | A1* | 4/2008 | Mock et al. | 455/404.1 |
| 2009/0288140 | A1* | 11/2009 | Huber et al. | 726/2 |
| 2009/0298475 | A1* | 12/2009 | Czaja et al. | 455/412.2 |
| 2009/0325566 | A1* | 12/2009 | Bell et al. | 455/419 |
| 2011/0086614 | A1* | 4/2011 | Brisebois et al. | 455/411 |

* cited by examiner

*Primary Examiner* — Kent Chang
*Assistant Examiner* — Nelson Rosario
(74) *Attorney, Agent, or Firm* — Sterne, Kessler, Goldstein & Fox P.L.L.C.

(57) ABSTRACT

A method and apparatus is disclosed to restrict access services to a communication device. The services may be restricted based upon hardware characteristics, geographic characteristics, user specifications of the communication device and/or specified rules. The method and apparatus may restrict its service to only specific applications suitable for the environment and the time. Upon a request for a service that is now restricted, the method and apparatus may notify an end user that the service was requested. Further, the method and apparatus may notify an originator of the request that the service is not available and may ask for a short message to be delivered to the end user.

20 Claims, 2 Drawing Sheets

Figure 1:
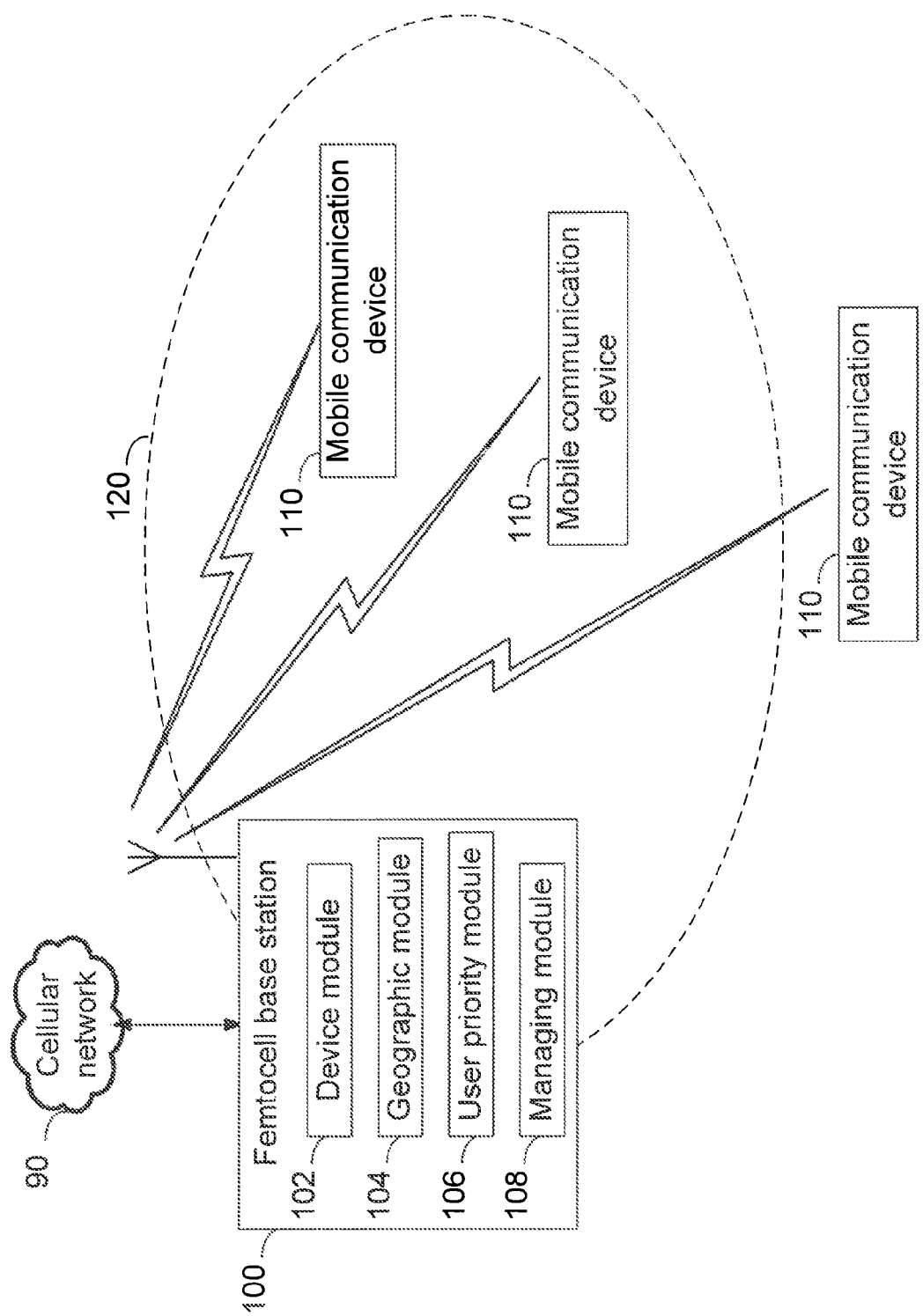

FEMTOCELL BASE STATION FOR CONTROLLING COMMUNICATION ACCORDING TO SPECIFIED CRITERIA

CROSS-REFERENCE TO RELATED APPLICATIONS

The present application claims the benefit of U.S. Provisional Patent Appl. No. 61/348,775, filed on May 27, 2010, which is incorporated herein by reference in its entirety.

BACKGROUND

1. Field of Invention

The present invention relates to the field of cellular communication, and more particularly, to a femtocell based system.

2. Related Art

Modern cellular handsets provide today a large range of services: Voice calls, SMS, Mails, Data browsing, MMS, instant messaging, browsing, etc. Nevertheless, some of these services are inappropriate in different environments or even disturbing. Examples: handsets ringing in a cinema or a theatre, during live broadcasting, etc. The disturbance of such services can be both to the environment (people/devices around the end user) or to the user himself (losing focus or distracting him).

It is desirable to protect specific areas at specific times that in such environments some of the services will be restricted. Nevertheless it is clear that the transaction/service initiator cannot be aware of the end user location therefore cannot avoid the disturbance.

A brute force approach is to locate a jammer in the area to be protected. The disadvantage is that the end user losses all way of communication. In many scenarios, for example public places this is even illegal. Imagine a Cinema, a doctor in stand by cannot be avoided being called.

The user itself may choose to protect himself or the area. For example, switching to vibration mode, disabling features on the handsets, etc. The disadvantage of this approach is that it involves a voluntary activity which not always happens. For example the user may malfunction the handset, forgets or doesn't want to cooperate with the environment request.

WIPO Publication No. 2009085608, which is incorporated herein by reference in its entirety, discloses a mobile device's or mobile station's access control method for e.g. analog or digital cellular system, involves determining precise geographic location of mobile device, and limiting access of mobile device to wireless communication network.

WIPO Publication No. 0130099, which is incorporated herein by reference in its entirety, discloses a cellular mobile communication system using code division multiple access, has control unit to determine whether mobile unit is within spatial portion based on carrier wave characteristics of received signal.

European Patent Document No. 2071878, which is incorporated herein by reference in its entirety, discloses a radio connection method of user terminal to picocell base station for wireless telecommunications systems, involves making user terminal find match between received unique identifier and identifier on list so as to send authorizing message.

European Patent Document No. 0813801, which is incorporated herein by reference in its entirety, discloses a cellular communication system, esp. for serving large office building—has base station as well as overlapping capsules in each cell receiving and transmitting traffic channels and receiving random access channels.

Prior to setting forth the background of the related art, it may be helpful to set forth definitions of certain terms that will be used hereinafter. The term "SMS" as used herein in this application, is defined as a text message included within a Short Message Service; the term "MMS" as used herein in this application, is defined as a message via a Multimedia Messaging Service.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 2:

FIG. 1 is a high level schematic block diagram of a femtocell base station according to an exemplary embodiment of the present invention; and FIG. 2 is a high level flowchart illustrating a method of controlling cellular communication within a specified area, according to an exemplary embodiment of the present invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

A desirable approach would be to still enable communication in the to be protected area, yet not counting on the good willingness or expertise of the end user. An immediate simple approach to solve the issue above is for the femtocell to send a notification (for example a paging SMS) to all camped users in the to be restricted area just before the window time asking to switch off/move to vibrate. Please note that this is not real SMS as they are not routed through the operator cellular network, but rather locally between the femtocell and the end user. It is understood that this method still relies on an end user manual operation, so it still has a drawback. The other proposed solution suggests using one or more femtocells as a means to protect specific areas.

FIG. 1 is a high level schematic block diagram of a femtocell base station according to an exemplary embodiment of the present invention. Femtocell base station 100 has a plurality of cellular communication devices 110 camped thereon and is in communication with at least one cellular network 90. Femtocell base station 100 comprises a device module 102 arranged to classify mobile communication devices 110 according to their hardware characteristics; a geographic module 104 arranged to classify mobile communication devices 110 according to geographic characteristics comprising a location and a distance from femtocell base station 100; a user priority module 106 arranged to classify mobile communication devices 110 according to a plurality of user specifications relating thereto; and a managing module 108 arrange to manage a plurality of resources of femtocell base station 100 in relation to the classifications by device module 102; geographic module 104; and user priority module 106 as well as in relation to specified rules.

For example, the specified rules may comprise a time window and an area 120, and managing module 108 may be arranged to block incoming and outgoing calls of mobile communication devices 110 within area 120 during the time window. Managing module 108 may be further arranged to notify each mobile communication device 110 about its incoming calls during the time window.

Managing module 108 may be arranged to prevent noise emitting calls and alerts from reaching mobile communication devices 110 within area 120 during the time window.

Upon the window time necessary to protect area 120, managing module 108 may restrict its service to only specific applications suitable for the environment and the time. For example in a theatre, only SMS may be possible, while voice, browsing, video calls, etc. are barred.

Upon an incoming call for a service that is now barred (restricted), the user may be notified by an SMS, indicating the user that another type of incoming call was received. For example upon an incoming voice call managing module 108 may deny the call to the end user so the end user may not get the incoming call. Consequently, managing module 108 may simulate an SMS message towards the end user notifying the end user that a voice call has been received at the specific time from the number X. It should be noted that the SMS is not a regular SMS as it doesn't go through cellular network 90, rather it is generated and transmitted locally from femtocell base station 100. Such notifications can be for other services as well: video call, instant message, mails, etc.

Upon an incoming call for a service that is now barred, managing module 108 may restrict the service as above. Further, it may notify the call originator that the end user is not available and may ask for a short message to be delivered to the end user via SMS. For example, upon an incoming voice call, femtocell base station 100 may automatically answer, notifying the call originator that the user cannot take the call, accordingly it may ask for a short message which may be voice to text translated and immediately after locally transmitted as a SMS to the end user. Other examples of service conversion can be: mail to SMS, SMS to mail, voice to mail, push to talk to SMS, etc.

In addition to the techniques above, several other techniques or derivatives can be used:

Total or partial service restriction during the window time, accumulating all notifications regarding restricted sessions and delivering them together at the end of the window time. For example restricting any kinds of services during a show, and delivering one mail/SMS at the end may a log of all restricted calls/SMS/MMS/etc. which occurred during the restricted window time.

End user service selectivity—services are restricted on a per end-user basis. For example, only the staff or doctors can get partial/all services, for all others the services are restricted to a subset, i.e., in a theatre the staff and doctors may be able to get voice calls, the audience only SMS.

The specified rules may comprise a distance dependent resource allocation pattern. The area size to be protected can be determined by the power of femtocell base station 100 or the distance of the end user from femtocell base station 100. Alternatively managing module 108 can work otherwise: Service selectivity per distance—scenarios may exist where femtocell base station 100 provides services outside the to be restricted area as well. For example, for femtocell base station 100 in a hall, that covers outside the hall as well. Femtocell base station 100 may use the propagation delay or round trip delay of the end user as a mean for service restriction. For example, femtocell base station 100 in a hall may enable SMS only for end-users in a range of 40 m, and all service for endusers outside this range. This technique can be farther applied to uplink power limitation according the end-user distance from femtocell base station 100 as a mean to restrict the interference to neighbor femtocells, For this purpose the neighbor cells interference limitation may be limited according the distance either by uplink max power limit, service limitations or service restriction. Example: distance above 300 m only SMS, 200-300 m voice calls only, 100-200 HSPA (High Speed Packet Access)<1 Mbps, <100 m—all services possible.

FIG. 2 is a high level flowchart illustrating a method of controlling cellular communication within a specified area, according to an exemplary embodiment of the present invention. The method comprises the following stages: establishing a femtocell base station and camping a plurality of cellular communication devices in the specified area on the femtocell base station (stage 200); classifying the mobile communication devices according to their hardware characteristics (stage 210); classifying the mobile communication devices according to geographic characteristics comprising a location and a distance from the femtocell base station (stage 220); classifying the mobile communication devices according to a plurality of user specifications relating thereto (stage 230); and managing a plurality of resources of the femtocell base station in relation to the classifications and in relation to specified rules (stage 240).

The specified rules may comprise a time window and an area, and further comprising blocking incoming and outgoing calls of the mobile communication devices within the area during the time window (stage 250), and notifying each mobile communication device about its incoming calls during the time window (stage 260). The specified rules comprise a distance dependent resource allocation pattern.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A femtocell base station in communication with a communication device, the femtocell base station comprising:
   a device module configured to classify the communication device according to its hardware characteristics;
   a geographic module configured to classify the communication device according to geographic characteristics of the communication device, wherein the geographic characteristics comprise a distance from the femtocell base station to the communication device;
   a user priority module configured to classify the communication device according to a user specification; and
   a managing module configured to:
      designate a predefined range from the femtocell base station as a protected area,
      manage a resource of the femtocell base station in relation to the classifications by the device module, the geographic module, the user priority module, and the predefined range, and
      initiate a generation of a message to be sent from the femtocell base station to the communication device if the communication device is within the predefined range, wherein the message includes information notifying the communication device about a blocked incoming call.

2. The femtocell base station of claim 1, wherein the managing module is further configured to block incoming and outgoing calls of the communication device within the predefined range during a specified time window.

3. The femtocell base station of claim 2, wherein the managing module is further configured to block the incoming and outgoing calls within a specified portion of the predefined range during the time window.

4. The femtocell base station of claim 1, wherein the managing module is further configured to prevent noise emitting calls and alerts from reaching the communication device within the predefined range during a specified time window.

5. The femtocell base station of claim 1, further comprising:
   a service conversion module configured to convert an original service addressing the communication device into a target service deliverable to the communication device based on conversion settings.

6. The femtocell base station of claim 1, wherein the communication device is one of a plurality of communication devices in communication with the femtocell base station.

7. The femtocell base station of claim 1, wherein the managing module is further configured to:
   initiate a generation of a second message to be sent from the femtocell base station to the communication device, wherein the second message includes information requesting that the communication device switch to a quiet mode.

8. The femtocell base station of claim 1, wherein the managing module is further configured to:
   initiate a generation of a second message to be sent from the femtocell base station to an originator of the blocked incoming call, wherein the second message includes information notifying the originator that the communication device is unavailable to receive the blocked incoming call.

9. The femtocell base station of claim 8, wherein the second message further includes information requesting the originator to send an SMS message to the communication device.

10. The femtocell base station of claim 1, wherein the managing module is further configured to:
   accumulate a plurality of blocked incoming calls received during a time window; and
   initiate the generation of the message after the time window has elapsed.

11. The femtocell base station of claim 1, wherein the managing module is further configured to determine whether to block the incoming call based on the user specification.

12. The femtocell base station of claim 1, wherein the predefined range is determined based on a power of the femtocell base station.

13. The femtocell base station of claim 1, wherein the predefined range is determined based on a transmission delay between the communications device and the femotocell base station.

14. A method of controlling communication within a specified area on a femtocell base station, comprising:
   classifying a communication device in the specified area according to its hardware characteristics;
   classifying the communication device according to geographic characteristics, wherein the geographic characteristics comprise a distance from the femtocell base station to the communication device;

classifying the communication device according to a plurality of user specifications;

designating a predefined range from the femtocell base station as a protected area;

managing a plurality of resources of the femtocell base station; and initiating a generation of a message to be sent from the femtocell base station to the communication device if the communication device is within the predefined range, wherein the message includes information notifying the communication device about a blocked incoming call.

15. The method of claim 14, wherein the method further comprises: blocking incoming and outgoing calls of the communication device within the predefined range during a specified time window.

16. The method of claim 14, wherein the method further comprises:

preventing noise emitting calls and alerts from reaching the communication device within the predefined range during a specified time window.

17. The method of claim 14, further comprising:

converting an original service addressing the communication device into a target service deliverable to the communication device based on conversion settings.

18. A femtocell base station in communication with a communication device, the femtocell base station comprising:

means for classifying the communication device according to its hardware characteristics;

means for classifying the communication device according to geographic characteristics of the communication device, wherein the geographic characteristics comprise a distance from the femtocell base station to the communication device;

means for classifying the communication device according to a user specification;

means for designating a predefined range from the femtocell base station as a protected area, wherein the predefined range is determined based on a power of the femotocell base station;

means for managing a resource of the femtocell base station; and means for initiating a generation of a message to be sent from the femtocell base station to the communication device if the communication device is within the predefined range, wherein the message includes information notifying the communication device about a blocked incoming call.

19. The femtocell base station of claim 18, wherein the means for managing comprises:

means for blocking incoming and outgoing calls of the communication device within the predefined range during a specified time window.

20. The femtocell base station of claim 18, wherein the means for managing comprises:

means for preventing noise emitting calls and alerts from reaching the communication device within the predefined range during a specified time window.

* * * * *